United States Patent [19]
Enomoto et al.

[11] Patent Number: 5,882,093
[45] Date of Patent: Mar. 16, 1999

[54] BRAKE CONTROL SYSTEM FOR AN ELECTRICALLY OPERATED VEHICLE

[75] Inventors: Naoyasu Enomoto, Handa; Masamoto Ando, Toyota; Toshiyuki Sakai, Kariya, all of Japan

[73] Assignee: Aisin Seiki Kabushiki Kaisha, Kariya, Japan

[21] Appl. No.: 877,872

[22] Filed: Jun. 18, 1997

[30] Foreign Application Priority Data

Jun. 20, 1996 [JP] Japan .................................. 8-181305

[51] Int. Cl.$^6$ ................................ B60T 8/58; B60L 7/10; B60L 7/22
[52] U.S. Cl. ........................... 303/152; 303/3; 303/113.5; 303/119.1; 188/156
[58] Field of Search ............................. 303/152, 3, 115.1, 303/115.2, 13–14, 114.1, 114.3, 113.4, 113.5, 116.2, 119.1, 119.2, 113.1; 701/71, 82; 180/65.1–65.8, 165; 188/156, 158, 355–359, 159; 60/545

[56] References Cited

U.S. PATENT DOCUMENTS 5,358,317  10/1994  Cikanek ................................. 303/152
5,568,962  10/1996  Enomoto et al. ....................... 303/152

FOREIGN PATENT DOCUMENTS 5-161211  6/1993  Japan .
7-336806  12/1995  Japan .

*Primary Examiner*—Douglas C. Butler
*Attorney, Agent, or Firm*—Burns, Doane, Swecker & Mathis, LLP

[57] ABSTRACT

The present invention is directed to a brake control system for controlling a braking force applied to a wheel of an electrically operated vehicle. A changeover device is disposed in a main passage for selectively placing one of a first operating position where a static hydraulic pressure supplied from a master cylinder to a wheel brake cylinder is controlled to be lower than a master cylinder pressure generated from the master cylinder when an electric motor applies the regenerative braking force to the wheel, and a second operating position where the static hydraulic pressure is controlled to be substantially equal to the master cylinder pressure when the electric motor does not apply the regenerative braking force to the wheel. A pressure transmitting device is communicated with a dynamic pressure generator through an auxiliary passage and connected to the main passage between the changeover device and the wheel brake cylinder, so that it fluidly separates the dynamic hydraulic pressure and the hydraulic pressure in the wheel brake cylinder, and transmits the dynamic hydraulic pressure to the wheel brake cylinder. And, a valve device is disposed in the auxiliary passage so as to close the auxiliary passage when the regenerative braking force is applied to the wheel, and alternately open and close the auxiliary passage when the hydraulic braking force is applied to the wheel.

7 Claims, 10 Drawing Sheets

BRAKE CONTROL SYSTEM FOR AN ELECTRICALLY OPERATED VEHICLE

BACKGROUND OF THE INVENTION

1. Field of the Invention

The present invention relates to a brake control system for an electrically operated vehicle to perform a regenerative braking operation and a hydraulic braking operation, and more particularly to the brake control system which is provided with a static pressure generator and a dynamic pressure generator, and which is adapted to apply a braking force to a wheel by supplying a dynamic hydraulic pressure from the dynamic pressure generator in a transitional period from the regenerative braking operation to the hydraulic braking operation.

2. Description of the Related Arts

In an electrically operated vehicle provided with an electric motor as a power source, the electric motor also functions as a generator for performing the regenerative braking operation to recover energy by charging a battery and increase the energy when driving the motor. Since the braking force applied to the vehicle wheels through the regenerative braking operation is limited, it must be compensated by a hydraulic braking operation. Therefore, both of the regenerative braking operation and the hydraulic braking operation are performed, in general. In order to add the hydraulic braking operation to the regenerative braking operation, for example, a relief valve is disposed between a master cylinder and a wheel brake cylinder to be opened when a difference in pressure between the master cylinder and the wheel brake cylinder exceeds a predetermined value.

In order to increase the efficiency of recovering the energy through the regenerative braking operation, various apparatuses have been proposed. According to a brake apparatus disclosed in Japanese Patent Laid-open Publication No.7-336806 for example, an ON/OFF valve is disposed between the master cylinder and the wheel brake cylinder, and closed when the regenerative braking operation is performed. In the Publication, it was raised as an issue to be solved that a brake pedal was moved forward to vary the depressing force, when the ON/OFF valve was switched from its closed condition to its open condition so as to cancel a mode for giving a priority to the regenerative braking operation. Therefore, the brake apparatus was proposed to rapidly increase the pressure in a hydraulic braking device by temporarily introducing a hydraulic pressure from a hydraulic booster.

With respect to the braking force applied through the regenerative braking operation as described above, FIG. 9 illustrates its limit (Fu). When a vehicle speed is in an intermediate speed zone (Vm), the limit (Fu) is provided for the braking force applied through the regenerative braking operation, due to mainly mechanical factors such as output torque. When the vehicle speed is in a high speed zone (Vh), the braking force applied through the regenerative braking operation is lowered in accordance with the increase of vehicle speed, due to mainly electrical factors such as an inverter, battery or the like. And, when the vehicle speed is in an extremely low speed zone (Vs), it is preferable not to perform the regenerative braking operation, because the energy consumed through the generating operation by the motor will be more than the energy recovered through the regenerative braking operation, and a vibration might occur during the regenerative braking operation. Therefore, when the braking force is applied to the vehicle moving at a speed "V1" as shown in FIG. 10, for example, it is preferable to apply the braking force only by the regenerative braking operation until the time "t1" as shown in FIG. 10. After the time "t1", the hydraulic braking operation may be added to the regenerative braking operation to apply the braking force by both of the regenerative braking operation and the hydraulic braking operation, and in the extremely low speed zone after the time "t2", only the hydraulic braking operation should be performed.

In such conditions as described above, when the braking operation is switched from the regenerative braking operation to the hydraulic braking operation, the master cylinder pressure is temporarily reduced until the wheel cylinder pressure is increased close to the master cylinder pressure, so that the stroke of the brake pedal is rapidly varied and the vibration of the depressing force occurs to deteriorate the brake pedal feeling, as described in the Publication No.7-336806. According to the apparatus proposed in the Publication, when the difference of the pressure between relief valves (VR1), (VR2) is to be cleared, a solenoid valve (V1) is closed at the outset and subsequently a solenoid valve (V4) is opened to temporarily introduce the hydraulic pressure from a hydraulic booster (HB), so as to prevent a large pressure difference from being caused between the master cylinder pressure and the wheel cylinder pressure.

According to the apparatus proposed in the Publication, however, the hydraulic booster (HB) included in a dynamic pressure circuit is connected to a static pressure circuit between the master cylinder and the wheel brake cylinder through the solenoid valve (V4). The static pressure circuit includes the relief valve (VR2) for use in adding the hydraulic braking operation to the regenerative braking operation or changing for it, a solenoid valve (V5) and a check valve (VC2). Therefore, when the hydraulic braking operation is changed for the regenerative braking operation, brake fluid is supplied from the hydraulic booster (HB) to the static pressure circuit, so that more amount of brake fluid is supplied from the hydraulic booster (HB) to the wheel brake cylinder, than the brake fluid supplied from the master cylinder. As a result, sealing members in the master cylinder might be deteriorated due to the residual pressure therein. Furthermore, in the apparatus according to the Publication, two pressure circuits are connected to each other through the solenoid valve (V4). Therefore, if malfunction occurs in the static pressure circuit with the solenoid valve (V4) held in its open position, the brake fluid might be discharged through the dynamic pressure circuit.

SUMMARY OF THE INVENTION

Accordingly, it is an object of the present invention to provide a brake control system for an electrically operated vehicle which is provided with a static pressure generator and a dynamic pressure generator, and which is adapted to add a hydraulic braking operation to a regenerative braking operation, or change the former for the latter smoothly in response to the hydraulic pressure generated from the dynamic pressure generator, with a static pressure circuit and a dynamic pressure circuit separated effectively.

In accomplishing the above and other objects, a brake control system is provided for controlling a braking force applied to a wheel of an electrically operated vehicle. The brake control system includes an electric motor operatively connected to the wheel for rotating the wheel, motor control means for controlling the electric motor to apply a rotating force to the wheel and apply a regenerative braking force to the wheel. Static pressure generating means is provided for pressurizing brake fluid stored in a reservoir in response to operation of a manually operated member to generate a static hydraulic pressure. An auxiliary power source is provided for pressurizing the brake fluid stored in the reservoir irrespective of operation of the manually operated member to generate a power pressure, and dynamic pressure generating means is provided for regulating the power pressure in response to operation of the manually operated member to generate a dynamic hydraulic pressure. A wheel brake cylinder is operatively connected to the wheel and communicated with the static pressure generating means through a main passage for applying a hydraulic braking force to the wheel in response to at least the static pressure supplied from the static pressure generating means to the wheel brake cylinder. Hydraulic pressure control means is provided for controlling the hydraulic braking force applied by the wheel brake cylinder to the wheel. Changeover means is disposed in the main passage for selectively placing one of a first operating position where the static hydraulic pressure supplied from the static pressure generating means to the wheel brake cylinder is controlled to be lower than the static hydraulic pressure generated from the static pressure generating means when the motor control means controls the electric motor to apply the regenerative braking force to the wheel, and a second operating position where the static hydraulic pressure supplied from the static pressure generating means to the wheel brake cylinder is controlled to be substantially equal to the static hydraulic pressure generated from the static pressure generating means when the motor control means controls the electric motor not to apply the regenerative braking force to the wheel. Pressure transmitting means is communicated with the dynamic pressure generating means through an auxiliary passage and connected to the main passage between the changeover means and the wheel brake cylinder. The pressure transmitting means is provided for fluidly separating the dynamic hydraulic pressure and the hydraulic pressure in the wheel brake cylinder, and transmitting the dynamic hydraulic pressure to the wheel brake cylinder to vary the hydraulic pressure in the wheel brake cylinder in accordance with variation of the dynamic hydraulic pressure. And, valve means is disposed in the auxiliary passage for closing the auxiliary passage when the motor control means controls the electric motor to apply the regenerative braking force to the wheel, and controlling the communication between the dynamic pressure generating means and the pressure transmitting means through the auxiliary passage when the hydraulic pressure control means controls the hydraulic braking force applied to the wheel.

Preferably, the above-described brake control system further includes a check valve which is disposed in parallel with the valve means. The check valve is provided for allowing the brake fluid to flow from the pressure transmitting means to the dynamic pressure generating means and blocking the reverse flow.

The valve means may include a switching valve which is disposed in the auxiliary passage. The switching valve is provided for closing the auxiliary passage when the motor control means controls the electric motor to apply the regenerative braking force to the wheel, and alternately opening and closing the auxiliary passage to control the hydraulic pressure in the wheel brake cylinder when the hydraulic pressure control means controls the hydraulic braking force applied to the wheel.

In the above-described brake control system, the pressure transmitting means preferably includes a cylindrical housing having an inner bore defined therein, and a piston slidably received in the inner bore of the housing for defining therein a pair of closed chambers on the opposite sides of the piston. One of the closed chambers is communicated with the valve means, and the other one of the closed chambers is communicated with the changeover means and the wheel brake cylinder.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
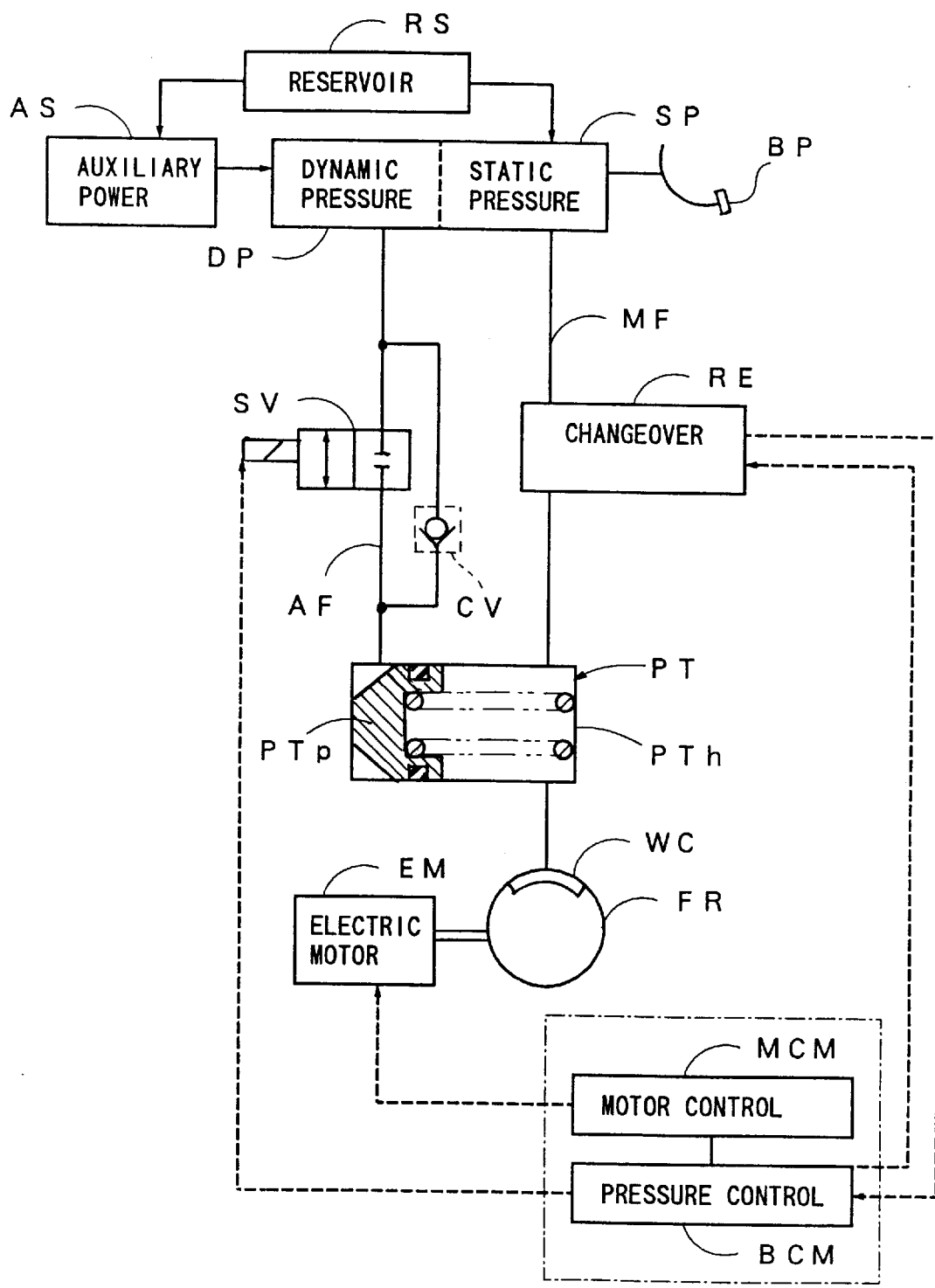
FIG. 1 is a general block diagram illustrating a brake control system for an electrically operated vehicle according to an embodiment of the present invention.

Referring to FIG. 1, there is schematically illustrated a brake control system for an electrically operated vehicle according to the present invention. An electric motor (EM) is operatively connected to a wheel (FR) so as to rotate the same. A motor control device (MCM) is adapted to control the electric motor (EM) to apply a rotating force to the wheel (FR) and apply a regenerative braking force to the wheel (FR). A static pressure generator (SP) is adapted to pressurize brake fluid stored in a reservoir (RS) in response to operation of a brake pedal (BP) which serves as a manually operated member, so as to generate a static hydraulic pressure. An auxiliary power source (AS) is adapted to pressurize the brake fluid stored in the reservoir (RS) irrespective of operation of the brake pedal (BP) so as to generate a power pressure. A dynamic pressure generator (DP) is adapted to regulate the power pressure in response to operation of the brake pedal (BP) so as to generate a dynamic hydraulic pressure. A wheel brake cylinder (WC) is operatively connected to the wheel (FR) and communicated with the static pressure generator (SP) through a main passage (MF) so as to apply a hydraulic braking force to the wheel (FR) in response to at least the static pressure supplied from the static pressure generator (SP) to the wheel brake cylinder (WC). A hydraulic pressure control device (BCM) is adapted to control the hydraulic braking force applied by the wheel brake cylinder (WC) to the wheel (FR).

The static pressure generator (SP) is communicated with the wheel brake cylinder (WC) through a main passage (MF), in which a changeover device (RE) is disposed to selectively place one of a first operating position where the static hydraulic pressure supplied from the static pressure generator (SP) to the wheel brake cylinder (WC) is controlled to be lower than the static hydraulic pressure generated from the static pressure generator (SP) when the motor control device (MCM) controls the electric motor (EM) to apply the regenerative braking force to the wheel (FR), and a second operating position where the static hydraulic pressure supplied from the static pressure generator (SP) to the wheel brake cylinder (WC) is controlled to be substantially equal to the static hydraulic pressure generated from the static pressure generator (SP) when the motor control device (MCM) controls the electric motor (EM) not to apply the regenerative braking force to the wheel (FR).

A pressure transmitting device (PT) is communicated with the dynamic pressure generator (DP) through an auxiliary passage (AF) and connected to the main passage (MF) between the changeover device (RE) and the wheel brake cylinder (WC). The pressure transmitting device (PT) is adapted to fluidly separate the dynamic hydraulic pressure and the hydraulic pressure in the wheel brake cylinder (WC), and transmit the dynamic hydraulic pressure to the wheel brake cylinder (WC) so as to vary the hydraulic pressure therein in accordance with variation of the dynamic hydraulic pressure. A valve device (SV) is disposed in the auxiliary passage (AF), and adapted to close the auxiliary passage (AF) when the motor control device (MCM) controls the electric motor (EM) to apply the regenerative braking force to the wheel (FR), and control the communication between the dynamic pressure generator (DP) and the pressure transmitting device (PT) through the auxiliary passage (AF) when the hydraulic pressure control device (BCM) controls the hydraulic braking force applied to the wheel (FR). The regulator (RG) may be adapted to regulate the power pressure in response to the hydraulic pressure output from the master cylinder (MC) to generate a regulated pressure in proportion to the master cylinder pressure, to be substantially the same pressure as the hydraulic pressure output from the master cylinder (MC).

A check valve (CV) is disposed in parallel with the valve device (SV), and adapted to allow the brake fluid to flow from the pressure transmitting device (PT) to the dynamic pressure generator (DP) and blocking the reverse flow. The pressure transmitting device (PT) includes a cylindrical housing (PTh) having inner bore defined therein, and a piston (PTp) slidably received in the inner bore of the housing (PTh) for defining therein a pair of closed chambers on the opposite sides of the piston (PTp). One of the closed chambers is communicated with the valve device (SV), and the other one of the closed chambers is communicated with the changeover device (RE) and the wheel brake cylinder (WC).

Figure 2:
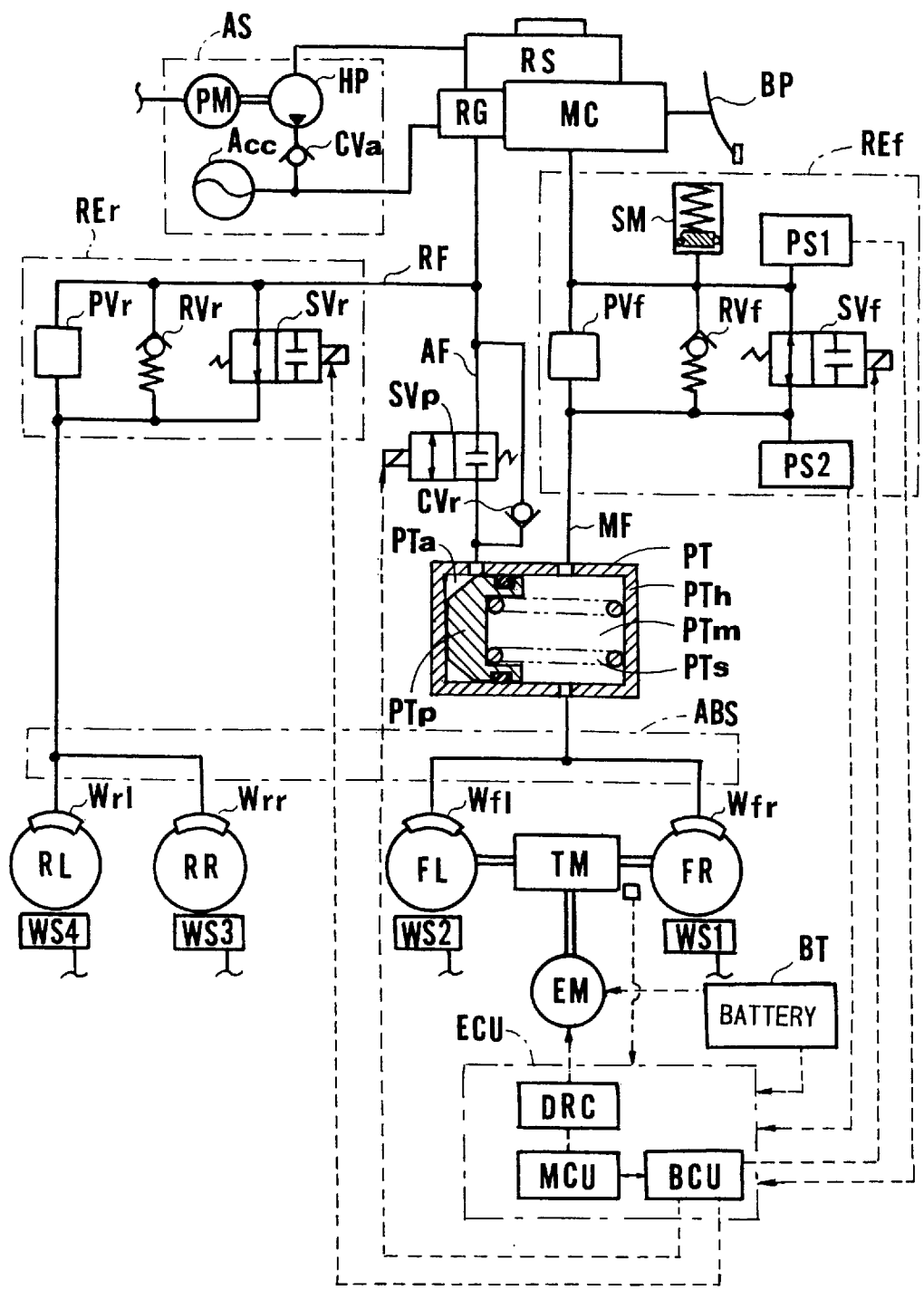
FIG. 2 is a schematic block diagram of a brake control system for an electrically operated vehicle according to an embodiment of the present invention.

More specifically, the details of the embodiment disclosed in FIG. 1 are illustrated in FIG. 2, in which a brake control system having an electric motor (EM) for performing the regenerative braking operation and a hydraulic pressure control apparatus for performing the hydraulic braking operation. The hydraulic pressure control apparatus has a master cylinder (MC) which serves as the static pressure generator (SP), and a regulator (RG) which serves as the dynamic pressure generator (DP). Both of the master cylinder (MC) and the regulator (RG) are operated in response to depression of the brake pedal (BP). Referring to FIG. 2, wheel brake cylinders (Wfr), (Wfl), (Wrr), (Wrl) are operatively mounted on wheels (FR), (FL), (RR), (RL) to apply braking force thereto, respectively. The wheel (FR) designates a wheel at the fore right side as viewed from the position of a driver's seat, the wheel (FL) designates a wheel at the fore left side, the wheel (RR) designates a wheel at the rear right side, and the wheel (RL) designates a wheel at the rear left side. According to the present embodiment, a front and rear dual-circuit system has been employed to divide the circuit into a front pressure circuit and a rear pressure circuit.

According to the present embodiment, a front drive system has been employed, so that the front wheels (FR), (FL) are driven, and the rear wheels (RR), (RL) are not driven. The front wheels (FR), (FL) are connected to the electric motor (EM) through the transmission (TM). The electric motor (EM) is controlled by an electronic control unit (ECU) which includes a motor control unit (MCU) for controlling the electric motor (EM) through a driving circuit (DRC) and a hydraulic control unit (BCU) for controlling the hydraulic braking pressure. Each of the control units includes a microcomputer (not shown), and its basic structure is similar to the one disclosed in the prior publication such as the aforementioned Publication No. 7-336806, so that further explanation is omitted. The electric motor (EM) used in the present embodiment is an induction motor having a rotor with permanent magnets for providing magnetic poles, and a stator with three-phase wires to which A.C. power is fed to generate a magnetic field for rotating the rotor. Therefore, the drive circuit (DRC) controlled by the motor control unit (MCU) is provided with a plurality of inverters. When the rotor of the electric motor (EM) is rotating in accordance with the rotation of the wheels (FR), (FL), the electric motor (EM) can be braked by generating a magnetic field for preventing the rotor from rotating. The electric power generated in the stator is recovered to charge the battery (BT) thereby to brake the wheels, i.e., to perform the regenerative braking operation.

The regulator (RG) is connected to an auxiliary power source (AS), and both of them are connected to the master cylinder (MC) and a low-pressure reservoir (RS) for storing therein the brake fluid. The auxiliary power source (AS) includes a hydraulic pump (HP) and an accumulator (Acc). The hydraulic pump (HP) is driven by an electric motor (PM) to pressurize the brake fluid in the reservoir (RS) and discharge it into the accumulator (Acc) through a check valve (CVa). The electric motor (PM) is activated when the pressure in the accumulator (Acc) is lower than a predetermined lower limit, and stopped when the pressure in the accumulator (Acc) exceeds a predetermined upper limit. Accordingly, the power pressure is supplied from the accumulator (Acc) into the regulator (RG), which regulates the power pressure in response to a pilot pressure of the master cylinder pressure output from the master cylinder (MC) to generate a regulated pressure in proportion to the master cylinder pressure, to be substantially the same pressure as the master cylinder pressure, like a known regulator. A part of the regulated pressure is provided for boosting the master cylinder (MC).

In a main passage (MF) which communicates the master cylinder (MC) with the front wheel brake cylinders (Wfr), (Wfl), a changeover device (REf) is disposed to add the hydraulic braking operation to the regenerative braking operation, and change the former for the latter. A transmitting device (PT) which serves as the pressure transmitting device according to the present invention is disposed between the changeover device (REf) and the wheel brake cylinders (Wfr), (Wfl) in the main passage (MF). The transmitting device (PT) is connected to the regulator (RG) through an auxiliary passage (AF), in which a solenoid valve (Svp) is disposed to serve as a switching valve in a valve device according to the present invention. The solenoid valve (SVp) is of a two-port two-position electromagnetic valve which is closed when it is in its inoperative condition, and opened when it is in its operative condition.

The transmitting device (PT) includes a cylindrical housing (PTh) with an inner bore defined therein, and a piston (PTp) which is slidably received in the inner bore of the housing (PTh) to define therein a pair of closed chambers on the opposite sides of the piston (PTp), i.e., a static pressure chamber (PTm) and a dynamic pressure chamber (PTa). A spring (PTs) is disposed in the static pressure chamber (PTm) to urge the piston (PTp) to the left in FIG. 2 so as to expand the volume of the static pressure chamber (PTm) to its maximum volume. The dynamic pressure chamber (PTa) is connected to the solenoid valve (SVp) through the auxiliary passage (AF), while the static pressure chamber (PTm) is connected to the main passage (MF) between the changeover device (REf) and the wheel brake cylinders (Wfr), (Wfl). According to the transmitting device (PT), therefore, the regulated pressure output from the regulator (RG) and the hydraulic pressure in the wheel brake cylinder are fluidly separated, so that the wheel cylinder pressure is varied in accordance with variation of the regulated pressure.

When the regulated pressure is not supplied from the regulator (RG) to the dynamic pressure chamber (PTa), the piston (PTp) is placed at a position where the volume of the static pressure chamber (PTm) is maximum as shown in FIG. 2. When the regulated pressure is supplied from the regulator (RG) to the dynamic pressure chamber (PTa) through the solenoid valve (SVp) in its open position, the piston (PTp) is pushed in such a direction as to compress the static pressure chamber (PTm) against the biasing force of the spring (PTs), so that the pressurized brake fluid is discharged through the main passage (MF) into the static pressure circuit to increase the pressure therein. In this case, the brake fluid will not be supplied excessively, because the amount of the brake fluid supplied into the static pressure circuit is limited to the maximum volume of the static pressure chamber (PTm).

In parallel with the solenoid valve (SVp), a check valve (CVr) is disposed with its inlet side connected to a position between the transmitting device (PT) and the solenoid valve (SVp). The check valve (CVr) is provided for allowing the brake fluid to flow from the transmitting device (PT) to the dynamic pressure chamber (PTa) of the regulator (RG) and blocking the reverse flow. Therefore, when the pressure in the circuit including the regulator (RG) is decreased, the brake fluid in the dynamic pressure chamber (PTa) will be returned to the regulator (RG) through the check valve (CVr).

As shown in FIG. 2, the changeover device (REf) includes a relief valve (RVf), a proportioning valve (PVf), and a solenoid valve (SVf) which are disposed in parallel with one another. The relief valve (RVf) is provided for closing the main passage (MF) until the hydraulic pressure output from the master cylinder (MC) reaches a predetermined pressure, and opening the main passage (MF) when the hydraulic pressure output from the master cylinder (MC) exceeds the predetermined pressure. The proportioning valve (PVf) is provided for controlling the hydraulic pressure output from the master cylinder (MC) in response to depression of the brake pedal (BP) into the hydraulic pressure having a certain relationship therewith to be supplied into the wheel brake cylinders (Wfr), (Wfl). The proportioning valve (PVf) has substantially the same structure as that of a conventional proportioning valve for use in a front-rear braking force distribution control, but has a break point in its inputoutput characteristic to be set at a lower pressure than the conventional proportioning valve, which will be described later in detail. A pair of pressure sensors (PS1), (PS2) are connected to the upstream and downstream of the relief valve (RVf) and the solenoid valve (SVf), respectively. A simulator piston (SM) is connected to a position between the changeover device (REf) and the master cylinder (MC), so as to provide a stroke for a vehicle driver in accordance with the depressed amount of the brake pedal (BP).

Figure 5:
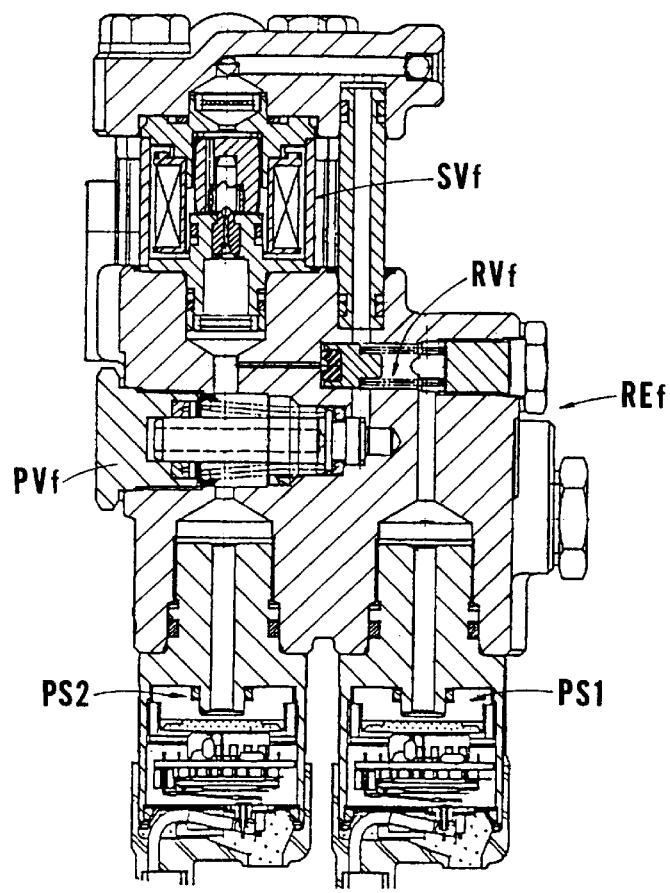
FIG. 5 is a sectioned view of a changeover device according to an embodiment of the present invention.
Figure 6:
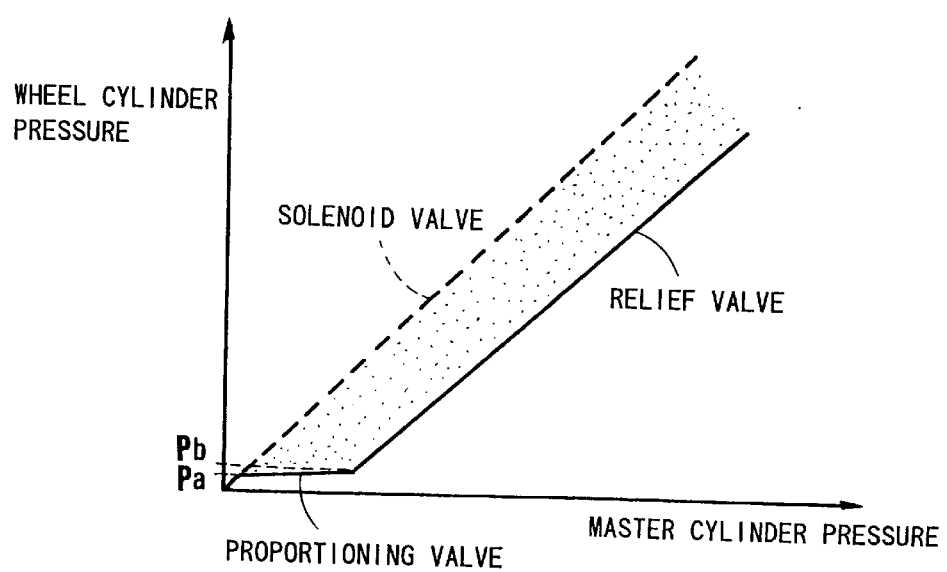
FIG. 6 is a diagram showing a relationship between a master cylinder pressure and a wheel cylinder pressure with respect to a relief valve, proportioning valve and solenoid valve in a changeover device according to an embodiment of the present invention.

An example of the changeover device (REf) having the relief valve (RVf), proportioning valve (PVf), solenoid valve (SVf), and pressure sensors (PS1), (PS2) is shown in FIG. 5, and its characteristic is shown in FIG. 6. The proportioning valve (PVf) has such a characteristic that the master cylinder pressure is increased in response to depression of the brake pedal (BP) when the braking operation started, so that the wheel cylinder pressure is increased in proportion to the increase of the master cylinder pressure, whereas the wheel cylinder pressure is held to be substantially constant when it reaches a predetermined pressure "Pa", and thereafter it will be increased by a small amount, e.g., at a gradient of 0.1, in response to the increase of the stroke of the brake pedal (BP). The predetermined pressure "Pa" is set as low as a value, which enables the brake fluid to be fulfilled in the wheel brake cylinders, e.g., 1 atm, so as to cause a brake pad (not shown) to abut on a rotor (not shown). Thus, the proportioning valve (PVf) has such functions as a function for fulfilling the brake fluid in the brake system at the start of the braking operation, a function for blocking the pressure until the relief valve (RVf) operates, and a function for returning the brake fluid from the wheel brake cylinders (Wfr), etc. to the master cylinder (MC).

The relief valve (RVf) operates in such a manner that it is closed until the wheel cylinder pressure reaches a predetermined pressure "Pb", and opened when the wheel cylinder pressure exceeds the predetermined pressure "Pb ", and thereafter the wheel cylinder pressure is proportional to the master cylinder pressure. When the solenoid valve (SVf) is placed in its open position, the wheel cylinder pressure corresponds to the master cylinder pressure as indicated by a broken line in FIG. 6. In other words, a dotted zone in FIG. 6 surrounded by the broken line indicating the characteristic of the solenoid valve (SVf), and solid lines indicating the characteristics of the relief valve (RVf) and the proportioning valve (PVf), is a pressure decreasing zone, where the regenerative braking operation is to be performed in lieu of the hydraulic braking operation.

In a hydraulic passage (RF) connected to the rear wheel brake cylinders (Wrr), (Wrl), a changeover device (REr) for the rear circuit is disposed. The changeover device (REr) includes a relief valve (RVr), a proportioning valve (PVr), and a solenoid valve (SVr) which are disposed in parallel with one another, in the same manner as the changeover device (REf) for the front circuit, and which function in the same way as the changeover device (REf), respectively.

Wheel speed sensors (WS1)–(WS4) are provided for the wheels (FR), (FL), (RR), (RL), respectively, as shown in FIG. 2, and connected to the electronic control unit (ECU) for providing thereinto pulse signals proportional to the rotational speeds of the wheels, or the wheel speeds, respectively. The pressure sensors (PS1), (PS2) are connected to the electronic control unit (ECU). Furthermore, a brake switch which is turned on when the brake pedal (BP) is depressed, a front steering angle sensor for detecting a steering angle of the front wheels (FR), (FL), a yaw rate sensor for detecting a yaw rate of the vehicle, a lateral acceleration sensor of the vehicle and the like are connected to the electronic control unit (ECU), if necessary. In a region surrounded by a one-dotted chain line and indicated by (ABS) in FIG. 2, a modulator having a plurality of solenoid valves which are omitted in FIG. 2, may be disposed and connected to the electronic control unit (ECU), whereby operations for an anti-skid control, traction control, front-rear braking force distribution control, steering control by braking and the like can be performed.

According to the brake control system as structured above, the solenoid valves (sVp), (SVf), (SVr) are controlled by a motor control unit (MCU) in the electronic control unit (ECU) to perform the brake control as will be explained hereinafter. The hydraulic pump (HP) is driven by the electric motor (EM) to accumulate the power pressure in the accumulator (Acc) as described before. In the case where the solenoid valves are placed in the positions as shown in FIG. 2, when the brake pedal (BP) is depressed, the master cylinder pressure is output from the master cylinder (MC), and the regulated pressure is output from the regulator (RG). Then, the master cylinder pressure is supplied to the wheel brake cylinders (Wfr), (Wfl) through the solenoid valve (SVf) and the static pressure chamber (PTm) of the transmitting device (PT) in the front circuit, while the regulated pressure is supplied to the wheel brake cylinders (Wrr), (Wrl) through the solenoid valve (SVr) in the rear circuit.

Figure 3A:
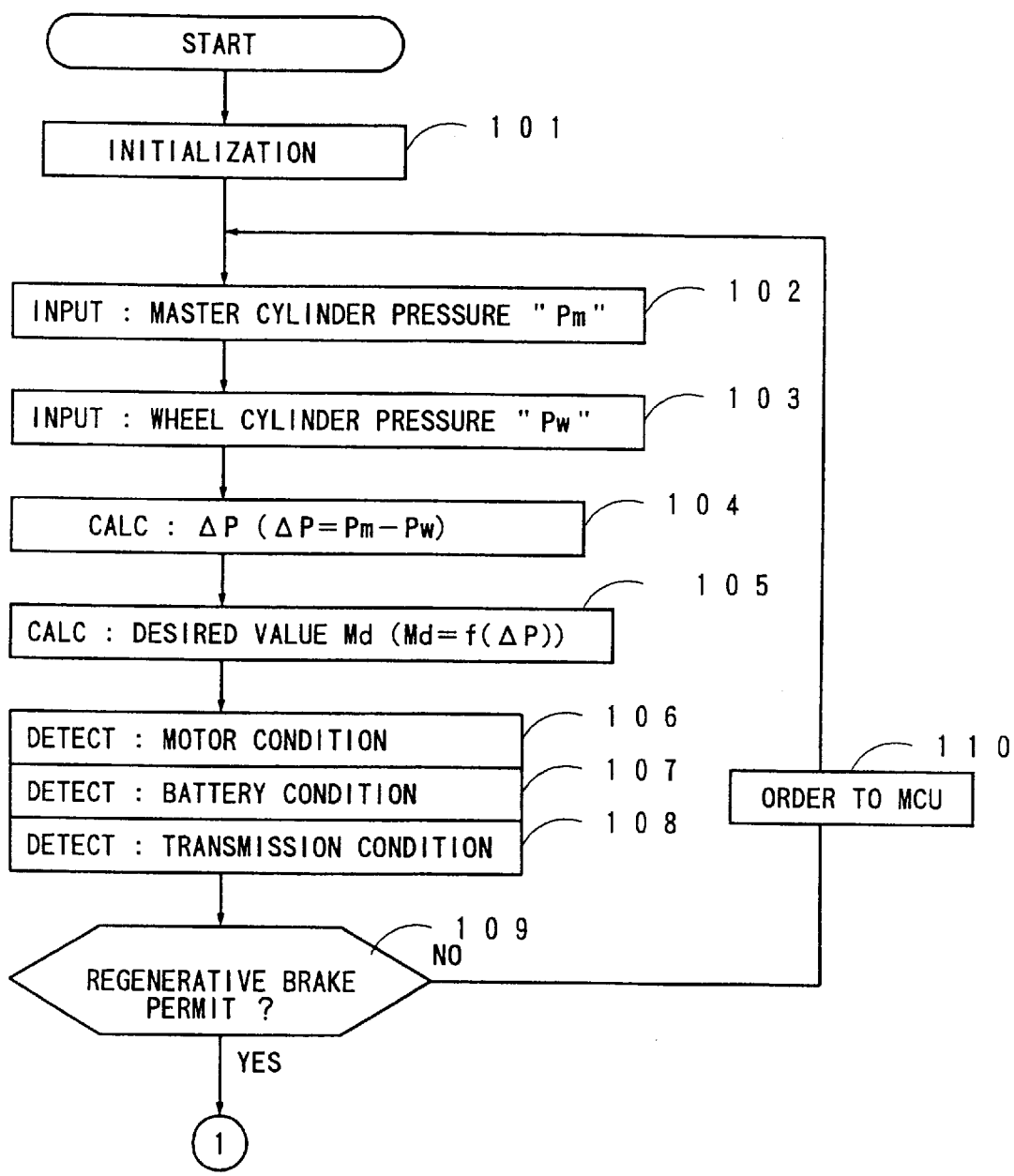
FIG. 3A and FIG. 3B are flowcharts showing a brake control operation according to an embodiment of the present invention.
Figure 3B:
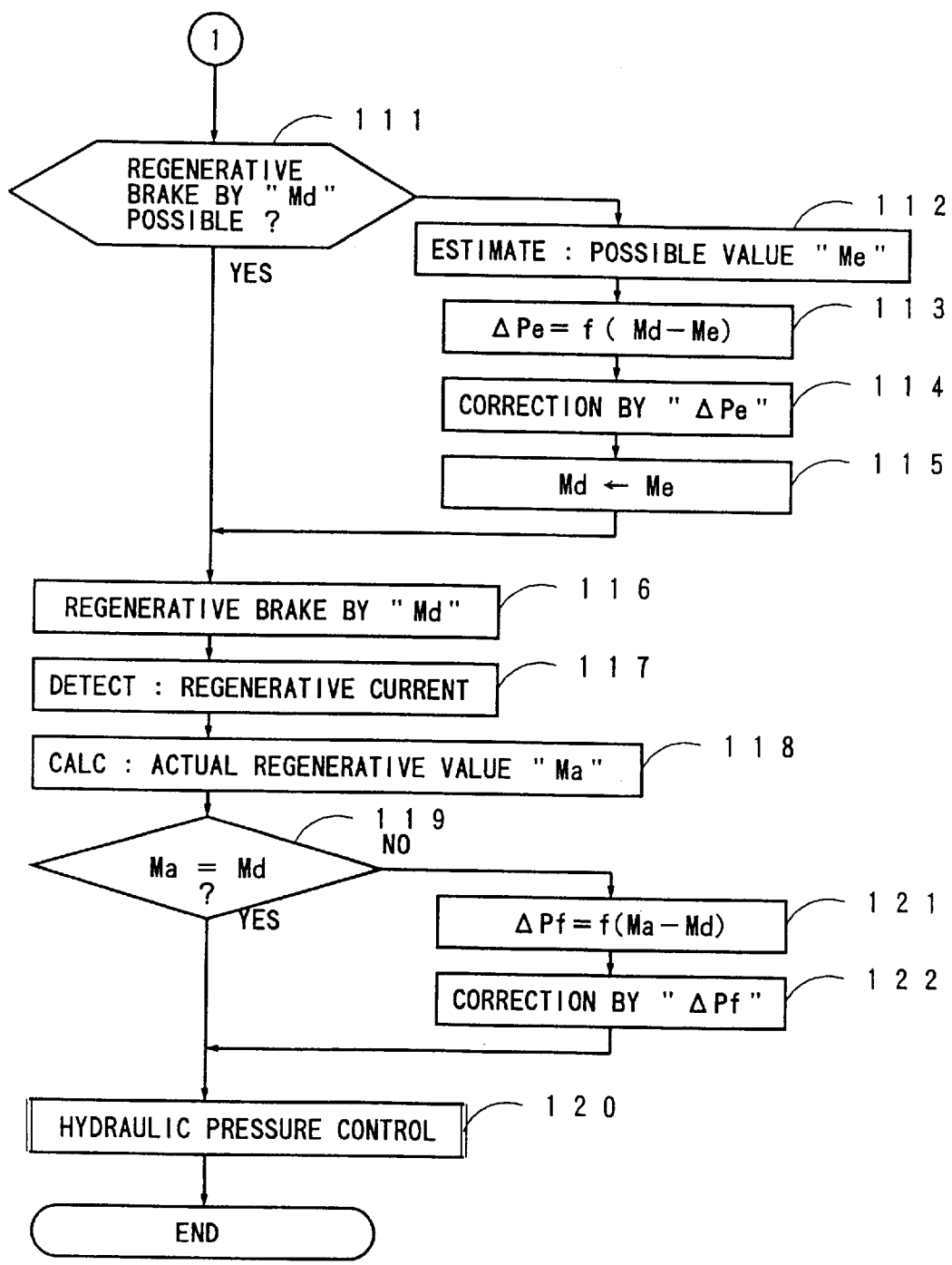

When an ignition switch (not shown) is turned on, the brake control operation is initiated by the electronic control unit (ECU), so that the program corresponding to the flow-chart as shown in FIGS. 3A and 3B is executed while the vehicle is moving. At the outset, the motor control unit (MCU) and the hydraulic control unit (BCU) are initialized at Step 101 to clear various data. Next, the master cylinder pressure "Pm" and wheel cylinder pressure "Pw" detected by the pressure sensors (PS1), (PS2) are read into the unit (ECU) at Steps 102, 103, so that a difference between the pressure "Pm" and pressure "Pw" is calculated at Step 104 to produce a difference $\Delta$ P (i.e., $\Delta$ P=Pm−Pw). On the basis of the difference $\Delta$ P, a desired regenerative value "Md" is calculated at Step 105 according to a function of the difference $\Delta$ P ( i.e., Md=f($\Delta$ P)). The difference $\Delta$ P can be estimated on the basis of only the master cylinder pressure, or a stroke of the brake pedal (BP) and the like, so that the desired regenerative value "Md" can be calculated directly, without calculating the difference $\Delta$ P.

Then, the program proceeds to Steps 106, 107, 108, where the conditions of the electric motor (EM), battery (BT) and transmission (TM) are detected to determine whether the condition for performing the regenerative braking operation has been fulfilled or not. For example, in the case where the vehicle is moving at an extremely low speed or moving at a high speed, the battery (BT) has been fully charged, a malfunction occurs, or the transmission (TM) is shifted in its neutral position, it is determined that the condition for performing the regenerative braking operation has not been fulfilled. In this case, therefore, the program proceeds to Step 110 where an order for prohibiting the regenerative braking operation is input to the motor control unit (MCU), and returns to Step 102. On the basis of the results detected at Steps 106–108, it is determined at Step 109 whether the condition for initiating the regenerative braking operation has been fulfilled or not. If the result is affirmative, the program proceeds to Step 111 where it is further determined whether the regenerative braking operation can be performed on the basis of the desired regenerative value "Md". If the result is affirmative, the program proceeds to Step 116 where the regenerative braking operation is performed on the basis of the desired regenerative value "Md".

On the contrary, if it is determined to be impossible at Step 111 to perform the regenerative braking operation on the basis of the desired regenerative value "Md", a possible regenerative value "Me" is estimated on the basis of the condition of electric motor (EM) at Step 112. For example, if the battery (BT) is fully charged, the possible regenerative value "Me" is estimated to be zero, whereas if the battery (BT) can be charged, the possible regenerative value "Me" is estimated to be the value corresponding to the possibly charged amount. Then, a difference $\Delta$ Pe between the desired regenerative value "Md" and the possible regenerative value "Me" is calculated according to a formula $\Delta$ Pe=f(Md−Me), at Step 113. Based on the difference $\Delta$ Pe, a correction order is provided at Step 114 for a hydraulic pressure control performed at Step 120 which will be explained later. And, the program proceeds to Step 115 where the possible regenerative value "Me" is employed as the desired regenerative value "Md", on the basis of which the regenerative braking operation is performed at Step 116. Through this regenerative braking operation, regenerative current is detected at Step 117, and an actual regenerative value "Ma" is calculated on the basis of the regenerative current at Step 118. The actual regenerative value "Ma" is compared with the desired regenerative value "Md" at Step 119. If it is determined at Step 119 that the actual regenerative value "Ma" is equal to the desired regenerative value "Md", the program proceeds to Step 120 where the hydraulic pressure control is performed. If there is a difference between the actual regenerative value "Ma" and the desired regenerative value "Md", the difference $\Delta$ Pf is calculated as a function of the difference between the desired regenerative value "Md" and the possible regenerative value "Me", i.e., $\Delta$ Pf=f(Ma−Md). Then, the correction order based on the difference $\Delta$ Pf is provided at Step 122, and the hydraulic pressure control is performed at Step 120.

Figure 4A:
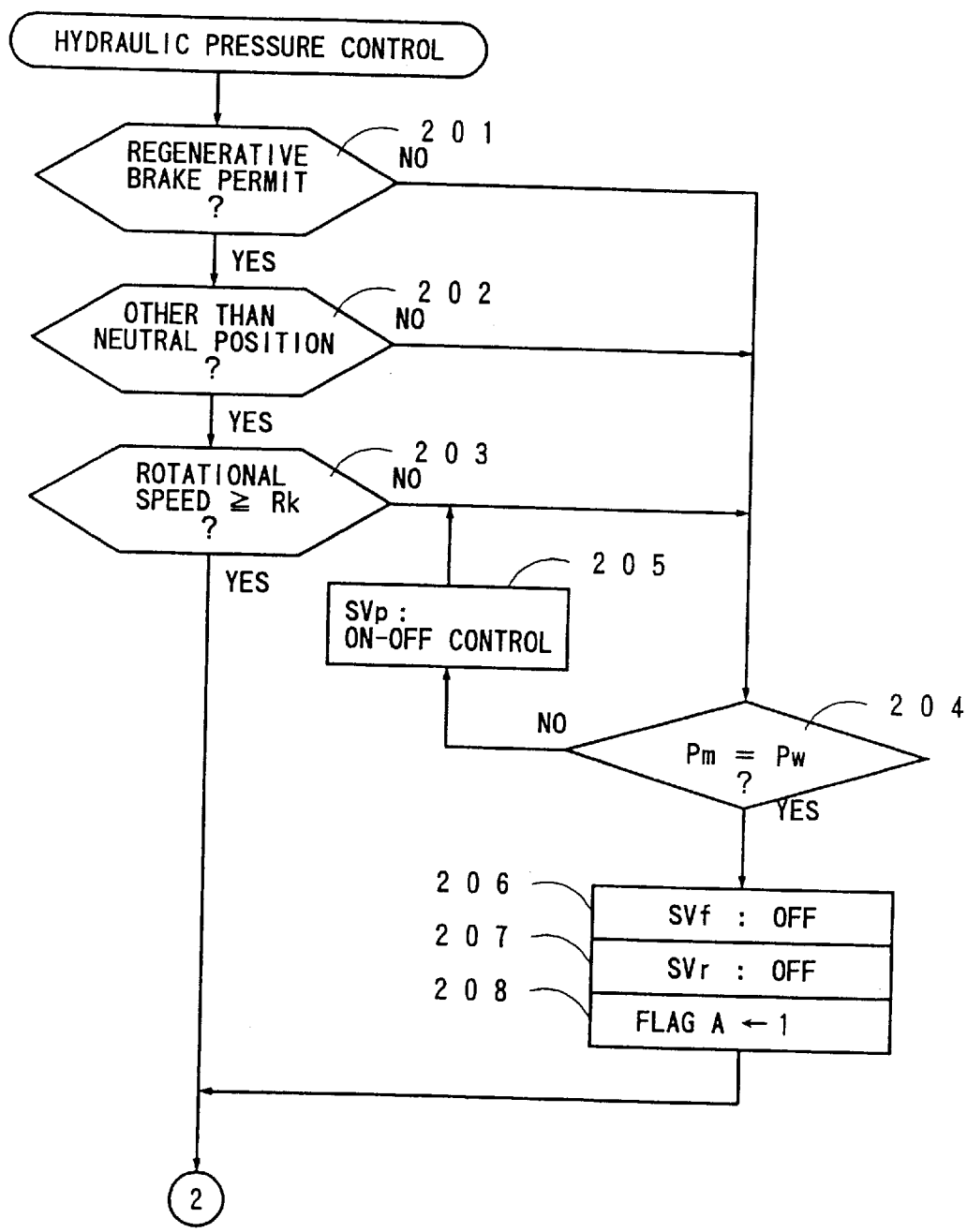
FIG. 4A and FIG. 4B are flowcharts showing a hydraulic pressure control operation according to an embodiment of the present invention.
Figure 4B:
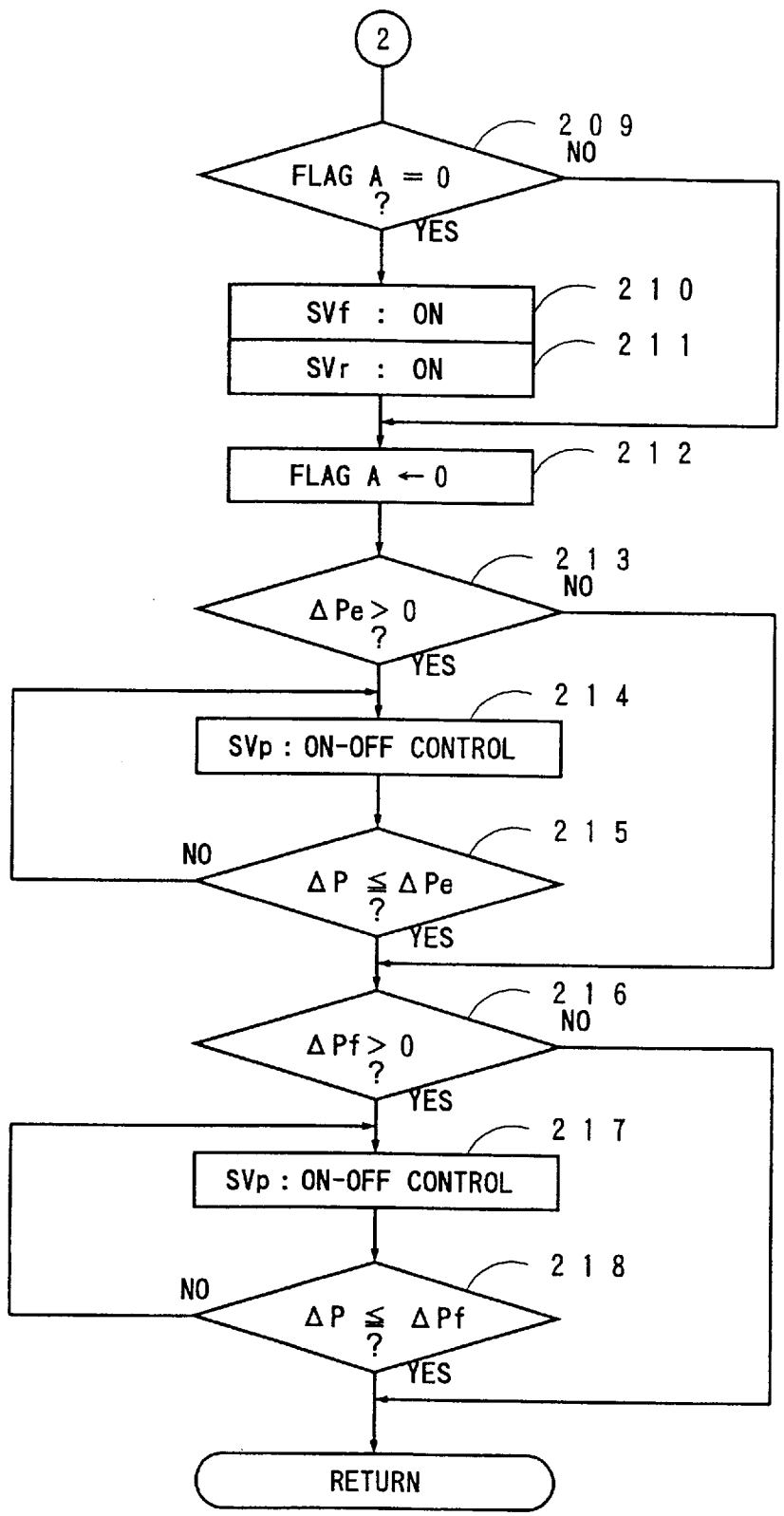

FIGS. 4A and 4B show the hydraulic pressure control performed at Step 120. At Step 201, it is determined whether the condition for initiating the regenerative braking operation has been fulfilled, or not. If the condition has been fulfilled, it is further determined whether the transmission (TM) is shifted on a position other than the neutral position and a parking position. If the result is affirmative, the program proceeds to Step 203 where a rotational speed of the electric motor (EM) is compared with a predetermined speed Rk (e.g., 400 rpm). If the rotational speed of the electric motor (EM) is lower than the predetermined speed Rk, it is determined that the electric motor (EM) is operated in an extremely low speed zone, the program proceeds to Step 204 where the master cylinder pressure "Pm" is compared with the wheel cylinder pressure "Pw". If it is determined that the master cylinder pressure "Pm" is different from the wheel cylinder pressure "Pw", the program proceeds to Step 205 where the solenoid valve (SVp) is energized and de-energized alternately (i.e., so-called ON-OFF control) to supply the regulated pressure to the wheel brake cylinders through the solenoid valve (SVp) until the wheel cylinder pressure "Pw" is equal to the master cylinder pressure "Pm". When the wheel cylinder pressure "Pw" becomes equal to the master cylinder pressure "Pm", the program proceeds to Steps 206, 207, 208, where the solenoid valves (SVf), (SVr) are turned off to be closed as shown in FIG. 2, and a FLAG A is set (1).

The program proceeds from Steps 203, 208 to Step 209 where the FLAG A is checked. After it was determined at Step 203 that the rotational speed of the electric motor (EM) was equal to or greater than the predetermined speed Rk, if the FLAG A has not been set, the program proceeds to Steps 210, 211 where the solenoid valves (SVf), (SVr) are turned on (i.e., closed state), and further proceeds to Step 212 where the FLAG A is reset (0), so that the regenerative braking operation is performed. If the FLAG A has been set at Step 208, the program proceeds from Step 209 to Step 212 with the solenoid valves (SVf), (SVr) turned off (i.e., open state), and the FLAG A is reset. Then, the program proceeds to Step 213 where it is determined if there is the difference Δ Pe, i.e., whether there is the correction order at Step 114 in FIG. 3B, or not. If there is the difference Δ Pe, the program proceeds to Steps 214, 215, where the solenoid valve (SVp) is turned on and off until the difference Δ P between the master cylinder pressure "Pm" and wheel cylinder pressure "Pw" becomes lower than the difference Δ Pe. If it is determined at Step 215 that the difference Δ P between the pressure "Pm" and pressure "Pw" is lower than the difference Δ Pe, the program proceeds to Step 216 where it is determined if there is the difference Δ Pf, i.e., whether there is the correction order at Step 122 in FIG. 3B, or not. If there is no difference such as Δ Pf, the program returns to the main routine as shown in FIG. 3B. If there is the difference Δ Pf, the program proceeds to Steps 217, 218, where the solenoid valve (SVp) is turned on and off until the difference Δ P between the pressure "Pm" and pressure "Pw" becomes lower than the difference Δ Pf.

Figure 7A:
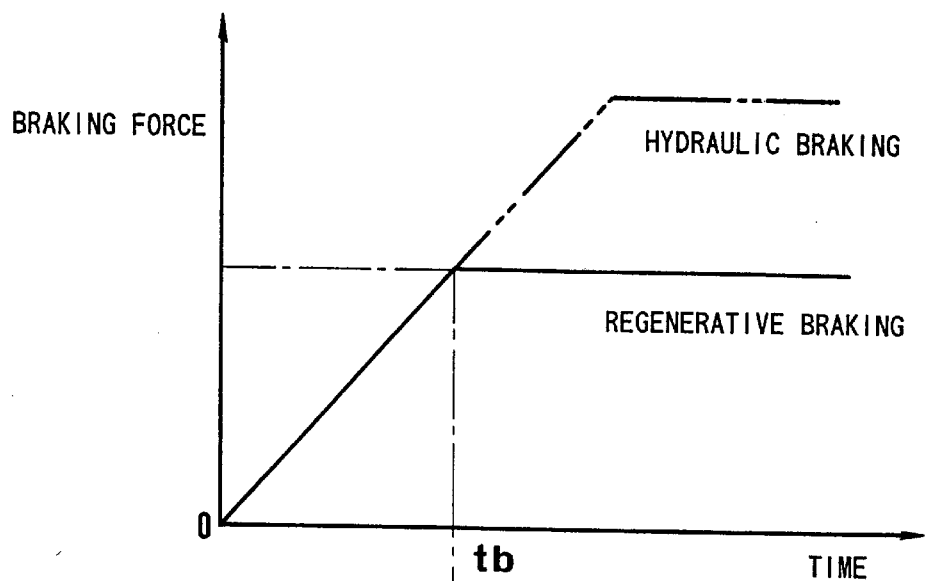
FIGS. 7A–7C are diagrams showing a characteristic of a brake control system in case of regenerative braking operation and hydraulic braking operation according to an embodiment of the present invention.
Figure 7B:
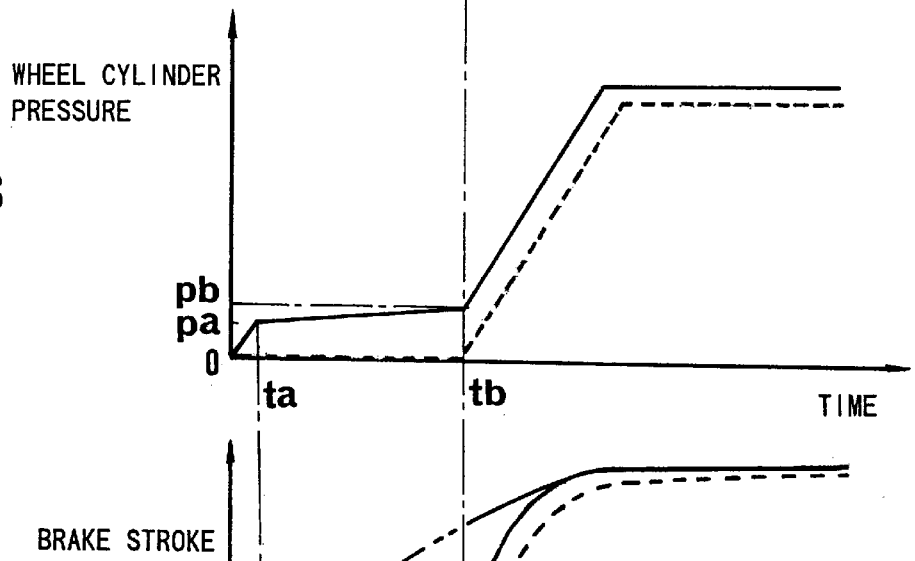
Figure 7C:
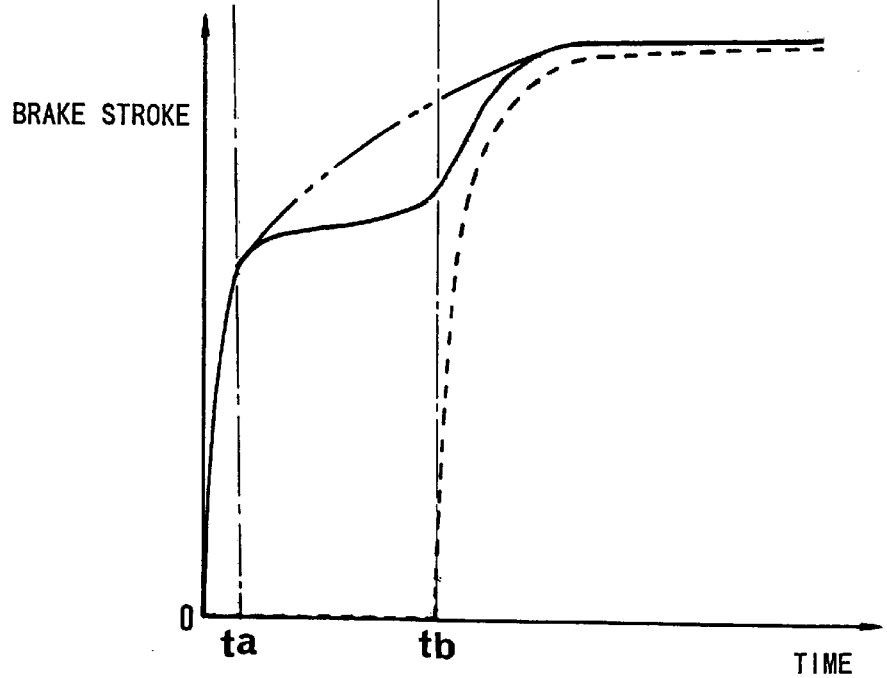

According to the changeover device (REf), for example, with the solenoid valves (SVp), (SVf) controlled to be opened and closed, and with the relief valve (RVf) and the proportioning valve (PVf) operated, the braking operation through only regenerative braking operation can be smoothly changed over to the braking operation through the combination of the regenerative braking operation and the hydraulic braking operation. Referring to FIGS. 7A–7C which illustrate the braking characteristic according to the present invention, after the brake pedal (BP) is depressed, only the regenerative braking operation is performed thereby to fulfill the initial brake fluid in the brake circuit until the time "tb" as shown in FIGS. 7A–7C. The hydraulic pressure in the wheel brake cylinder is increased in proportion to depression of the brake pedal (BP) until the time "ta" as shown in FIGS. 7B and 7C. After the time "ta", however, it is so controlled that the increasing rate of the hydraulic pressure is reduced comparing with the increasing rate of the stroke of the brake pedal (i.e., the increasing rate of the master cylinder pressure), according to the characteristic of the proportioning valve (PVf) as shown in FIG. 6. As a result, the initial stroke of the brake pedal (BP) is ensured, but the wheel cylinder pressure is held to be low as shown in FIG. 7C. Furthermore, the characteristic as indicated by a two-dotted chain line in FIGS. 7A and 7B can be obtained by means of the simulator piston (SM). In contrast to the above characteristics, the broken line in FIGS. 7B and 7C indicates a characteristic of the system without the proportioning valve (PVf), which characteristic will give the vehicle's driver an unpleasant feeling. At the time "tb", the relief valve (RVf) having the characteristic as shown in FIG. 6 is opened, the wheel cylinder pressure is rapidly increased as shown in FIG. 7B, so that the hydraulic braking operation is added to the regenerative braking operation as shown in FIG. 7A, and thereafter both of the hydraulic braking operation and the regenerative braking operation will be applied until the vehicle will be in the extremely low speed zone.

Figure 8A:
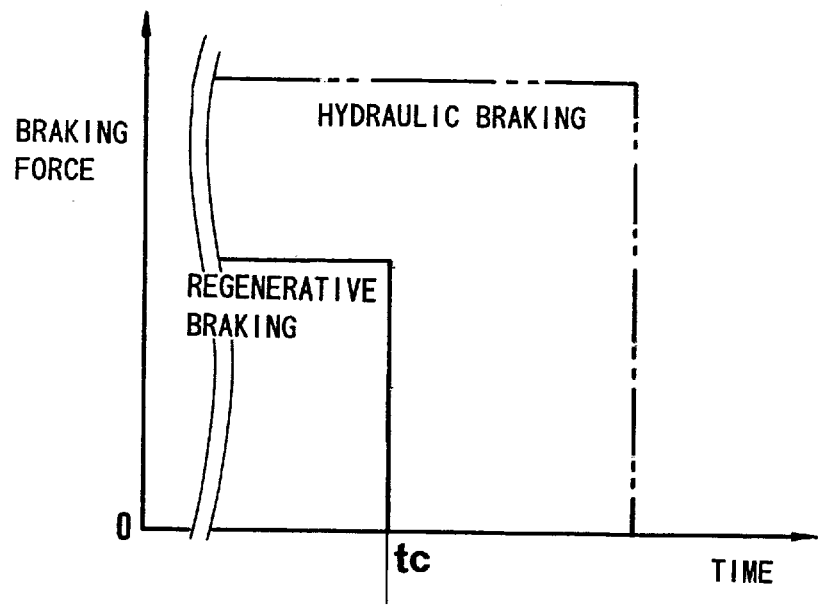
FIGS. 8A–8C are diagrams showing a characteristic of a brake control system operated in an extremely low speed zone in case of regenerative braking operation and hydraulic braking operation according to an embodiment of the present invention.
Figure 8B:
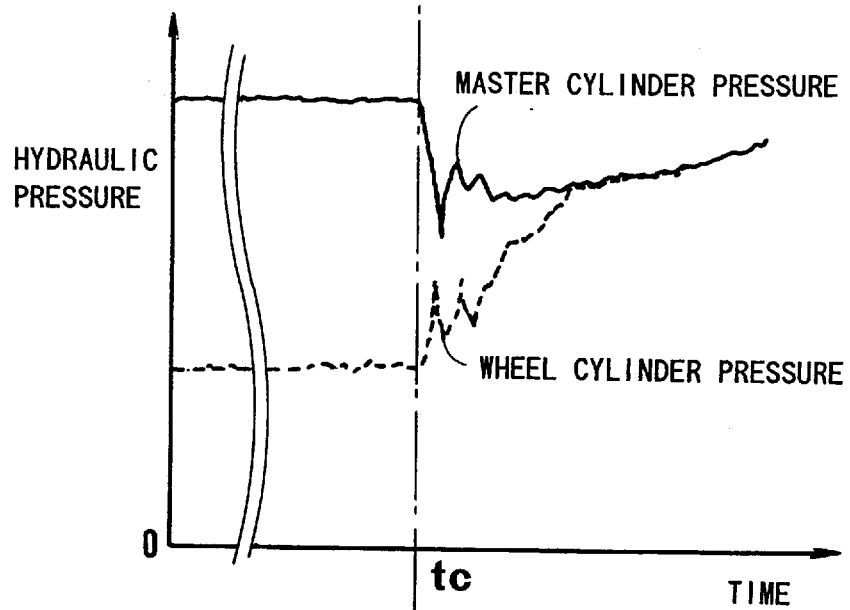
Figure 8C:
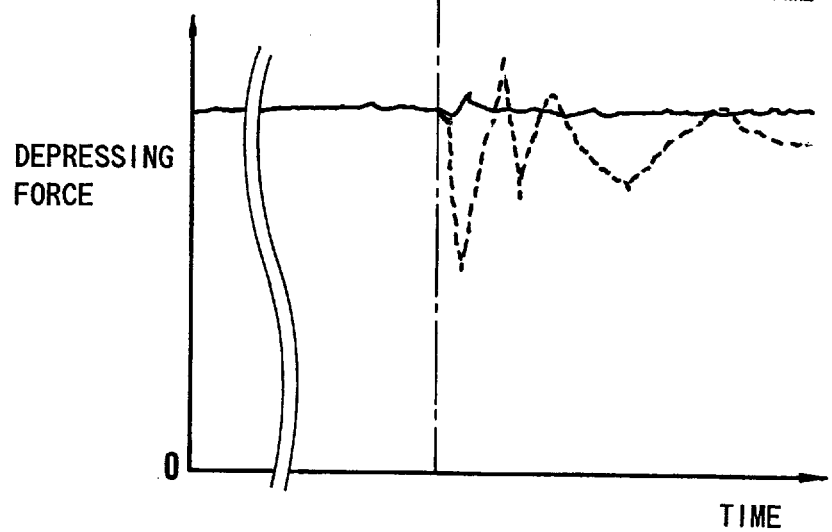
Figure 9:
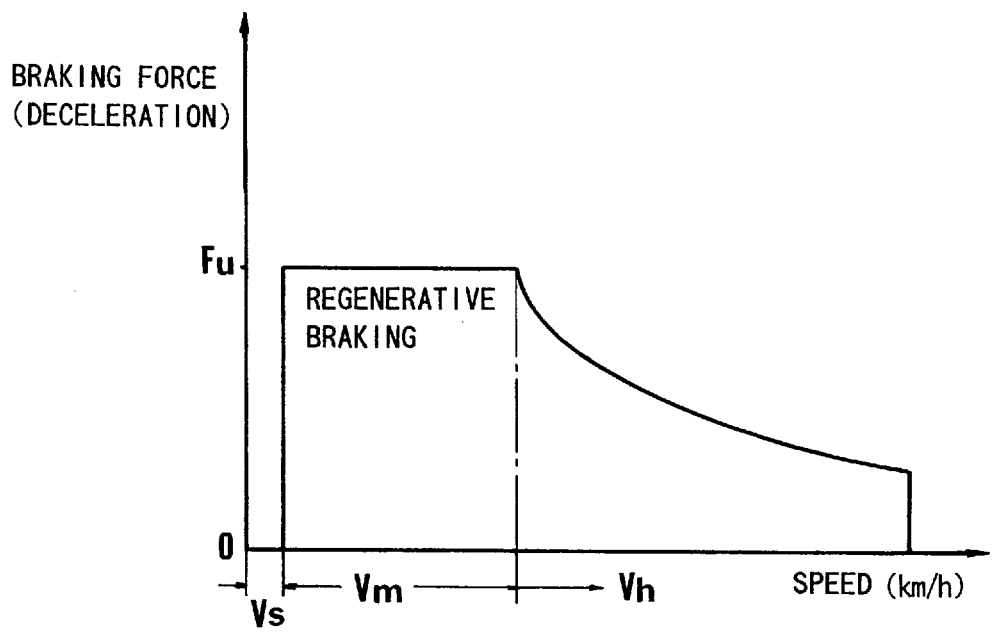
FIG. 9 is a diagram showing a limit of regenerative braking operation according to a conventional electrically operated vehicle.
Figure 10:
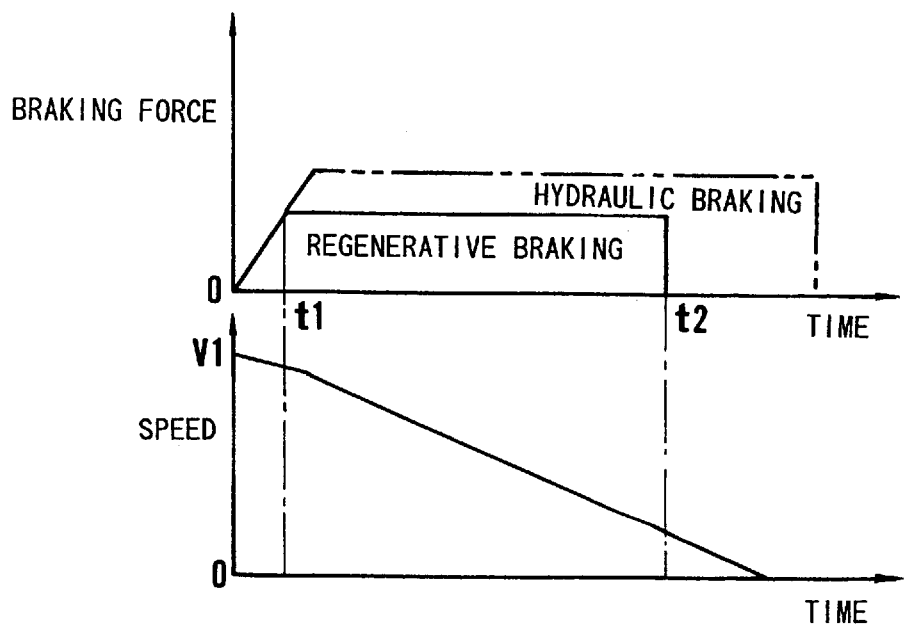
FIG. 10 is a diagram showing a braking force distribution in case of regenerative braking operation and hydraulic braking operation according to a conventional electrically operated vehicle.

When the vehicle is in the extremely low speed zone immediately before the braking operation is terminated, the regenerative braking operation is terminated at the time "tc" as shown in FIG. 8. A in this case, if the solenoid valve (SVf) is simply turned off, the large difference between the master cylinder pressure and the wheel cylinder pressure will be rapidly reduced to equalize them as shown in FIG. 8B, so that the depressing force of the brake pedal (BP) will vibrate as shown by a broken line in FIG. 8C, to cause a socalled pedal shock to the vehicle's driver. According to the present embodiment, however, the solenoid valve (SVp) is turned on and off repeatedly (i.e., ON-OFF control, as shown in Step 205 of FIG. 4A), and the solenoid valve (SVf) will be turned off only after the regulated pressure is supplied from the regulator (RG) to the wheel brake cylinder so that the wheel cylinder pressure is controlled to be equal to or substantially equal to the master cylinder pressure. Therefore, the variation of the depressing force of the brake pedal (BP) is largely reduced to be stable as indicated by a solid line in FIG. 8C, so that the pedal shock will not occur. When the hydraulic braking operation is performed according to the present embodiment, the regulated pressure output from regulator (RG) and the wheel cylinder pressure is fluidly separated from each other by the transmitting device (PT), and the amount of brake fluid supplied to the static pressure circuit is limited to the maximum volume of the dynamic pressure chamber (PTa), so that the brake fluid will not be supplied excessively to the static pressure circuit.

It should be apparent to one skilled in the art that the above-described embodiments are merely illustrative of but one of the many possible specific embodiments of the present invention. Numerous and various other arrangements can be readily devised by those skilled in the art without departing from the spirit and scope of the invention as defined in the following claims.

What is claimed is:

1. A brake control system for controlling a braking force applied to a wheel of an electrically operated vehicle, comprising:

an electric motor operatively connected to said wheel for rotating said wheel;

motor control means for controlling said electric motor to apply a rotating force to said wheel and apply a regenerative braking force to said wheel;

static pressure generating means for pressurizing brake fluid stored in a reservoir in response to operation of a manually operated member to generate a static hydraulic pressure;

an auxiliary power source for pressurizing the brake fluid stored in said reservoir irrespective of operation of said manually operated member to generate a power pressure;

dynamic pressure generating means for regulating the power pressure in response to operation of said manually operated member to generate a dynamic hydraulic pressure;

a wheel brake cylinder operatively connected to said wheel and communicated with said static pressure generating means through a main passage for applying a hydraulic braking force to said wheel in response to at least the static pressure supplied from said static pressure generating means to said wheel brake cylinder;

hydraulic pressure control means for controlling the hydraulic braking force applied by said wheel brake cylinder to said wheel;

changeover means disposed in said main passage for selectively placing one of a first operating position where the static hydraulic pressure supplied from said static pressure generating means to said wheel brake cylinder is controlled to be lower than the static hydraulic pressure generated from said static pressure generating means when said motor control means controls said electric motor to apply the regenerative braking force to said wheel, and a second operating position where the static hydraulic pressure supplied from said static pressure generating means to said wheel brake cylinder is controlled to be substantially equal to the static hydraulic pressure generated from said static pressure generating means when said motor control means controls said electric motor not to apply the regenerative braking force to said wheel;

pressure transmitting means communicated with said dynamic pressure generating means through an auxiliary passage and connected to said main passage between said changeover means and said wheel brake cylinder, said pressure transmitting means fluidly separating the dynamic hydraulic pressure and the hydraulic pressure in said wheel brake cylinder, and transmitting the dynamic hydraulic pressure to said wheel brake cylinder to vary the hydraulic pressure in said wheel brake cylinder in accordance with variation of the dynamic hydraulic pressure; and valve means disposed in said auxiliary passage for closing said auxiliary passage when said motor control means controls said electric motor to apply the regenerative braking force to said wheel, and controlling the communication between said dynamic pressure generating means and said pressure transmitting means through said auxiliary passage when said hydraulic pressure control means controls the hydraulic braking force applied to said wheel.

2. The brake control system as claimed in claim 1, further comprising a check valve disposed in parallel with said valve means, said check valve allowing the brake fluid to flow from said pressure transmitting means to said dynamic pressure generating means and blocking the reverse flow.

3. The brake control system as claimed in claim 2, wherein said valve means includes a switching valve disposed in said auxiliary passage for closing said auxiliary passage when said motor control means controls said electric motor to apply the regenerative braking force to said wheel, and alternately opening and closing said auxiliary passage to control the hydraulic pressure in said wheel brake cylinder when said hydraulic pressure control means controls the hydraulic braking force applied to said wheel.

4. The brake control system as claimed in claim 1, wherein said pressure transmitting means includes a cylindrical housing having an inner bore defined therein, and a piston slidably received in the inner bore of said housing for defining therein a pair of closed chambers on the opposite sides of said piston, one of said closed chambers communicated with said valve means, and the other one of said closed chambers communicated with said changeover means and said wheel brake cylinder.

5. The brake control system as claimed in claim 4, wherein said static pressure means includes a master cylinder for generating a hydraulic pressure in response to operation of said manually operated member, and said dynamic pressure generating means includes a regulator for regulating the power pressure generated from said auxiliary pressure source in proportion to the hydraulic pressure generated from said master cylinder.

6. The brake control system as claimed in claim 1, wherein said changeover means comprises:

a relief valve disposed in said main passage, said relief valve being closed until the hydraulic pressure in said wheel brake cylinder reaches a first predetermined value, and opened when the hydraulic pressure in said wheel brake cylinder exceeds the first predetermined value;

a proportioning valve disposed in parallel with said relief valve, said proportioning valve increasing the hydraulic pressure in said wheel brake cylinder in proportion to the increase of the hydraulic pressure generated from said master cylinder, holding the hydraulic pressure in said wheel brake cylinder to be substantially constant when the hydraulic pressure in said wheel brake cylinder reaches a second predetermined value which is lower than the first predetermined value; and two-port two-position valve which is disposed in parallel with said relief valve, and which is closed when said motor control means controls said electric motor to apply the regenerative braking force to said wheel, and opened when said hydraulic pressure control means controls the hydraulic braking force applied to said wheel.

7. The brake control system as claimed in claim 6, wherein said valve means includes a switching valve which is disposed in said auxiliary passage, and which is closed when said motor control means controls said electric motor to apply the regenerative braking force to said wheel, and alternately opened and closed to control the hydraulic pressure in said wheel brake cylinder when said hydraulic pressure control means controls the hydraulic braking force applied to said wheel.

* * * * *